Figure 3:
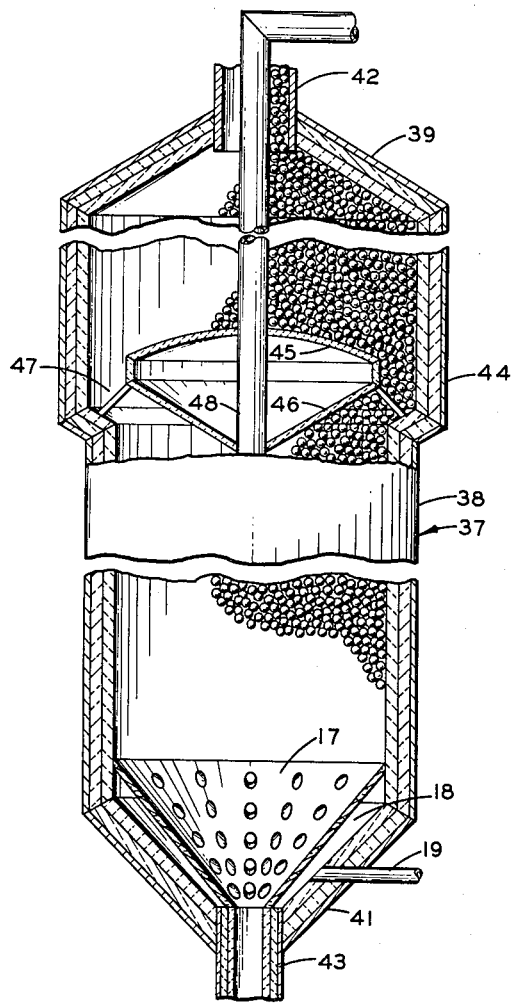

April 3, 1956
C. S. LYNCH
2,740,619
PEBBLE HEATER APPARATUS
Filed Oct. 4, 1951
2 Sheets-Sheet 1
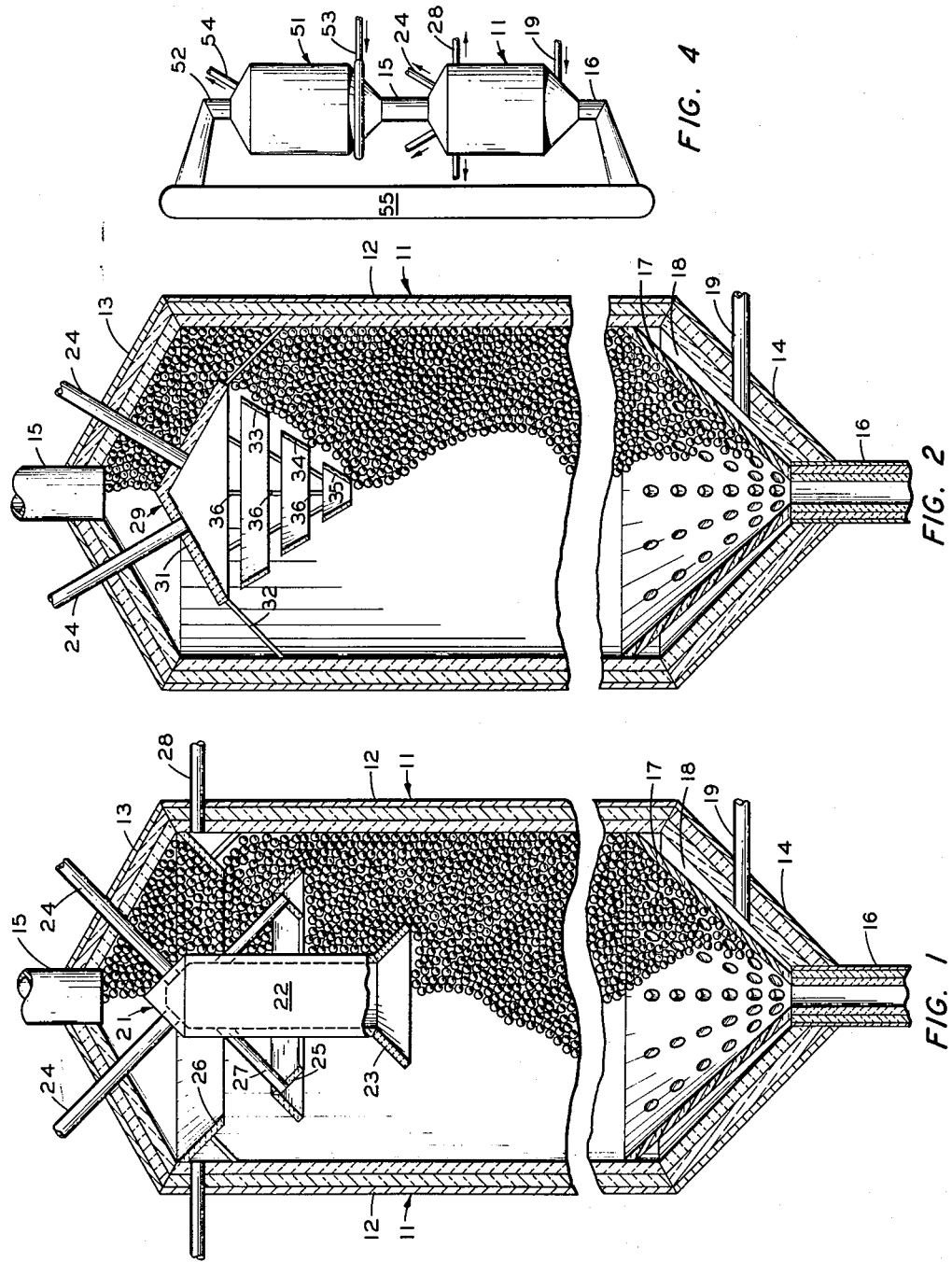
INVENTOR.
C. S. LYNCH
BY Hudson and Young
ATTORNEYS April 3, 1956

C. S. LYNCH 2,740,619

PEBBLE HEATER APPARATUS

Filed Oct. 4, 1951

2 Sheets-Sheet 2

INVENTOR.
C.S. LYNCH
BY Hudson and Young

ATTORNEYS

United States Patent Office 2,740,619
Patented Apr. 3, 1956

2,740,619

PEBBLE HEATER APPARATUS

Charles S. Lynch, Bartlesville, Okla., assignor to Phillips Petroleum Company, a corporation of Delaware Application October 4, 1951, Serial No. 249,648

6 Claims. (Cl. 263—19)

This invention relates to pebble heater apparatus. In one of its more specific aspects, it relates to an improved pebble chamber having a central pebble inlet. In another of its more specific aspects, it relates to an improved pebble reactor chamber. In another of its more specific aspects, it relates to an improved method for obtaining heat exchange between fluid materials and gravitating solid heat exchange materials. In another of its more specific aspects, it relates to an improved pebble chamber having peripheral pebble inlets.

Thermal conversion processes which are carried out in so-called pebble heater apparatus utilize a gravitating mass of solid heat exchange material, which mass is heated to a high temperature by passing hot gaseous material therethrough in a first direct heat exchange step and is then caused to contact gaseous reactant materials, furnishing heat to such reactant materials in a second direct heat exchange. The conventional pebble heater apparatus generally comprises two chambers which may be disposed in substantially vertical alignment. The solid heat exchange material is introduced into the upper portion of the first chamber. That material forms a gravitating contiguous bed of solid heat exchange material which flows downwardly through the chamber in direct heat exchange with hot gaseous heat exchange material. The solid heat exchange material is heated to a high temperature in the heat exchange and is then gravitated to the second chamber in which the solid heat exchange material is caused to contact the gaseous reactant materials in the second direct heat exchange relation, furnishing heat thereto for treatment or conversion of the gaseous materials.

Conventional pebble heater chambers of pebble heater apparatus are generally formed as cylinders in which a solid heat exchange material is collected in the form of a contiguous gravitating bed. Hot heat exchange gases are generally introduced into the cylindrical bed, generally at its lower end portion, and are passed countercurrent to the gravitating flow of the solid heat exchange material within the chamber. The gaseous material is removed from the upper portion of the heat exchange chamber and the solid heat exchange material is withdrawn from substantially a central point in the bottom of the bed and is gravitated into a lower chamber wherein a second moving bed of solid heat exchange material is formed.

One disadvantage which is encountered in the operation of conventional pebble heater apparatus is that it is most difficult to establish uniform contact between the gaseous heat exchange material and the solid heat exchange material. In the withdrawal of solid heat exchange material from a substantially central point in the bottom of a pebble chamber, the moving solid heat exchange material tends to form a cone substantially conforming on its bottom surface to the normal angle of repose. That material which is below and outside of the cone remains in what is substantially a stagnant area. At the same time when solid heat exchange material is introduced centrally or peripherally into the upper portion of the pebble chamber, the top of the solid heat exchange material forms a mass having an upper surface extending downwardly and away from the solid material inlet in the top of the chamber. The slope of the top surface is substantially the normal angle of repose for pebbles of that particular shape, size and surface. It will thus be seen that when pebbles are withdrawn from a centrally disposed pebble outlet in a chamber having a central pebble inlet, the gravitating pebble bed is of lesser thickness at points laterally displaced therefrom than at points corresponding to the solid material conduit axis because of the fact that the top and bottom of the bed form oppositely extending cones.

Heat exchange is obtained directly between the pebbles and a gas in each of the chambers. Reactant materials which are introduced into the reaction chamber are raised to conversion temperature by direct heat exchange with the hot solid heat exchange material in the reaction chamber and resulting reaction products are removed from the upper portion of that chamber. Gaseous material which flows upwardly through the gravitating mass of solid heat exchange material within the reaction chamber tends to follow the path of least resistance. That path of least resistance is generally through that portion of the bed which is the thinnest. Those portions of the pebble bed in a reactor chamber which correspond to the axis of the pebble reactor chamber are generally the hottest when the chamber has a central pebble inlet and a central pebble outlet.

There are several reasons why the axial portions of the solid material bed are hotter than the portions laterally removed therefrom. It has been known for some time that solid materials flowing through the portion of the reaction chamber corresponding to the axis of the central pebble outlet conduits gravitate more rapidly than do the solid materials in the portions of the bed laterally removed therefrom unless gravitation in that axial portion is retarded by some flow control means, such as baffles, or the like. Thus the solid materials flowing through the portions of the bed corresponding to the axis of the outlet conduit normally have less unit contact time with the gaseous materials in the reaction chamber and give up less of their heat to those materials than do solid materials flowing at a lower flow rate in the peripheral portion of the chamber.

Still another reason for non-uniform temperature when gaseous effluent is removed from above the top surface of the pebble mass within a pebble heat exchange chamber, is normally found in the fact that as solid materials are introduced into the top of the reaction chamber they are caused to contact some gaseous material while at the peak of the cone or top points of the solid material formed as a bed within that chamber. As the solid material rolls downwardly and outwardly over the top of the solid material bed, the solid material contacts even more of the gaseous material giving up heat thereto. Thus, as the solid material finally reaches the base of the cone of the solid material bed, it has given up much more heat to the gaseous material than has that portion of the solid contact material which remains to correspond to the axial portion of the solid material inlet conduit. The temperature differential of pebbles across the top of the pebble bed between the uppermost portion and the lowermost portion thereof generally varies within the range of 100° F. and 250° F. depending upon the gas flow rate and pebble flow rate. An additional portion of the heat is removed from the peripheral portion of the solid contact material bed by heat transfer through the walls of the reaction chamber.

In view of the above discussion it is quite apparent that ordinarily a great temperature differential exists between the portion of the gravitating solid material contact bed corresponding to the uppermost portion of the top pebble bed surface and the portion corresponding to the lowermost portion of the top pebble bed surface. Obviously, in conventional pebble heat exchange chambers, time-temperature conditions to which the gases in the pebble mass corresponding to the inlet conduit axis are subjected, are much more severe than those conditions to which gases flowing through the bed portion corresponding to the lowermost top surface are subjected. Many attempts have been made to overcome this problem of uneven temperature distribution in the reaction chamber such as providing baffle members which substantially retard gravitation of the solid contact material through the central portion of the contact material bed, thereby providing greater unit contact time in the axial portion of the contact material bed and somewhat improving the temperature distribution. Use of baffle members and fluid inlet risers in the lower end portion of pebble heat exchange chambers has been found in many cases to materially disrupt normal pebble flow patterns within the pebble heat exchange chamber. Even though flow of pebbles through the length of the reaction chamber is brought to a more uniform rate by means of baffle members and the like, temperature differences still exist by reason of the heat loss of the solid contact material in its travel from the axial to the peripheral portion of the contact material bed upon introduction into the reaction chamber and also heat loss through the wall of the reaction chamber.

Solid heat exchange material which is conventionally used in pebble heater apparatus is generally called "pebbles." The term "pebbles" as used herein denotes any solid refractory material of flowable size and form having strength, which is suitable to carry large amounts of heat from the pebble heating chamber to the gas heating chamber without rapid deterioration or substantial breaking. Pebbles conventionally used in pebble heater apparatus are substantially spherical in shape and range from about ⅛ inch to about 1 inch in diameter. In a high temperature process, pebbles having a diameter of between about ¼ to ⅜ inch are preferred. The pebbles must be formed of a refractory material which will withstand temperatures at least as high as the highest temperature attained in the pebble heating chamber. The pebbles must also be capable of withstanding temperature changes within the apparatus. Refractory materials, such as metal alloys, ceramics, or other satisfactory material may be utilized to form such pebbles. Silicon carbide, alumina, periclase, beryllia, "Stellite," zirconia, and mullite may be satisfactorily used to form such pebbles or may be used in admixture with each other or with other materials. Pebbles formed of such materials, when properly fired, serve very well in high temperatures, some withstanding temperatures up to about 3500° F. Pebbles which are used may be either inert or catalytic as used in any selected process.

By at least one aspect of this invention, at least one of the following objects is attained. An object of this invention is to provide an improved pebble heat exchange chamber. Another object of the invention is to provide an improved gaseous effluent removal system by pebble heat exchange chambers. Another object of the invention is to provide an improved pebble flow control system. Another object of the invention is to provide an improved method for contacting pebbles and fluids within pebble heat exchange chambers. Another object of the invention is to provide improved means for obtaining uniform heating of gaseous materials within a pebble reactor chamber. Another object of the invention is to provide an improved reaction chamber. Other and further objects and advantages will be apparent to those skilled in the art upon study of the accompanying discussion and the drawings.

Broadly speaking, this invention comprises a means by which the flow pattern through pebble heat exchange chambers is materially modified so as to permit the heat exchange between gaseous materials and pebbles within any vertical section of the pebble mass to be more uniform. The pebble heat exchange chamber is modified so as to provide a top inner surface which deviates from the horizontal by an angle greater than the normal angle of repose of the pebbles and by providing an improved gaseous effluent outlet system in the upper portion of the heat exchange chamber so as to remove gaseous materials flowing through the axial portion of the pebble mass from that pebble mass at a lower level in the chamber than is gaseous effluent flowing through portions of the pebble mass laterally removed from the axial portion thereof. Pebbles which are introduced into a pebble chamber through a central inlet conduit tend to form a cone, as discussed above, the sides of which cone slope generally from the horizontal at an angle substantially equal to the normal angle of repose of the pebbles, i. e., generally about 28 degrees to 32 degrees from the horizontal. In the chamber of this invention, the top of the chamber causes a deformation of the top of the pebble mass so as to cause the pebble mass to flow directly against the top of the chamber. The gaseous effluent removal system of this invention provides means which remove gaseous effluent at a relatively lower level in the axial portion of the reaction chamber and gaseous effluent is removed from annuli progressively removed from the axis of said chamber at correspondingly higher levels in said chamber so that a line drawn between gaseous escape openings from the axis through the progressively laterally removed annuli is disposed from the horizontal by at least 35 degrees and preferably within the range of between 35 degrees and 70 degrees. This type of gaseous effluent removal system materially increases the uniformity of heat exchange between the gaseous materials which flow through the respectively vertical sections of the heat exchange mass within the heat exchange chamber.

Better understanding of this invention will be obtained upon reference to the diagrammatic drawings in which Figure 1 is a sectional elevation of the heat exchange chamber of this invention. Figure 2 is a schematic sectional elevation of a preferred modification of the heat exchange chamber of this invention. Figure 3 is a schematic sectional elevation of another modification of the pebble heat exchange chamber of this invention. Figure 4 is a schematic elevational representation of pebble heater apparatus.

Referring particularly to Figure 1 of the drawings, pebble chamber 11 comprises upright elongated shell 12 closed at its upper and lower ends by closure members 13 and 14, respectively. Pebble inlet conduit 15 is centrally provided in the upper end of closure member 13 and pebble outlet conduit 16 is provided in the lower end of closure member 14. Baffle or gas distributor member 17 which is frusto-conical in shape extends downwardly from the side walls of shell 12 to closely encompass the upper end portion of pebble outlet conduit 16. Baffle member 17 is perforate so as to permit the flow of gaseous material but to preclude the passage of solid pebbles therethrough. This baffle member 17 is spaced from bottom closure 14 so as to provide a gas distribution chamber 18 therebetween. Gaseous material inlet conduit 19 extends through the closure member 14 so as to communicate with chamber 18. Effluent removal means 21 in the upper end portion of chamber 11 comprise a plurality of gas take-off means which are disposed at different levels within that chamber.

Gaseous effluent take-off means 21 comprises a major receptacle 22 which is axially positioned within the upper portion of the chamber formed within shell 12 and is provided with an outwardly extending skirt 23 at its lower end portion. The lower end portion of receptacle 22 is open so as to permit the flow of gaseous material upwardly therethrough. Gaseous effluent conduits 24 extend from the upper end portion of receptacle 22 to the exterior of shell 12. Gaseous collectors 25 and 26 are provided in annuli progressively removed from the axis of said chamber. Each effluent collector progressively removed from the axis of the chamber is positioned on a progressively higher level within the chamber. A line extending from the bottom end of receptacle 22 through effluent collector members 25 and 26 deviates from the horizontal by an angle greater than the normal angle of repose of pebbles. It is generally preferred that the alignment of these effluent collector members be such that lines drawn therethrough would deviate from the horizontal by angle within the range of from 35 degrees to 70 degrees. Effluent collector means 25 is preferably an inverted V or gutter-type collector which is preferably provided in the shape of an annulus and coaxially surrounding receptacle 22. Effluent conduits 27 extend from the inner portion of effluent collector 25 to the interior of the receptacle 22. Effluent collector 26 is formed as an inwardly and downwardly extending baffle member which extends about the upper portion of shell 12 as a peripheral baffle being connected along its upper edge to the wall of shell 12 by a gas-tight seal. Gaseous effluent may be removed from the interior of the void chamber portion formed below effluent collector 26 by means of conduits extending into the interior of receptacle 22 or by means of conduits 28 extending directly through shell 12 as shown in the drawing.

Pebbles introduced into the central portion of chamber 11 form a contiguous pebble mass within that chamber, the upper surface of which is defined by the inner surface of top closure member 13. The pebbles gravitate through chamber 11 over effluent collector members 26 and 25 and downwardly over the outwardly and downwardly extending skirt 23 of receptacle 22. The effluent collector members and skirt 23 form void spaces within the interior of the pebble mass and permit ready separation of the gaseous effluent from that particular annulus of the reaction chamber in which they are positioned. Gaseous material which is introduced into the lower portion of chamber 11 through inlet conduit 19 is distributed within the distributing chamber 18 and escapes through perforations in baffle member 17 into the lower portion of the gravitating mass and flows upwardly therethrough countercurrent to the flow of the pebbles.

Referring particularly to Figure 2 of the drawings, it will be noted that parts corresponding to identical parts described in connection with Figure 1 are designated by like numerals. The structure set forth in Figure 2 differs from that described in connection with Figure 1 in the particular gaseous effluent removal system 29. Provided in the upper end portion of shell 12 and forming the top closure of the gaseous effluent removal system 29 is an imperforate conical baffle member 31 supported from the wall of shell 12 by means of support members 32. Annular members 33, 34 and 35, which are progressively smaller in diameter are provided coaxially with conical member 31 and at progressively lower level within chamber 11 so that the slope of a line running generally from the periphery of conical member 31 downwardly and inwardly through members 33, 34, and 35 deviates from the horizontal by an angle greater than the normal angle repose of pebbles utilized within the chamber and preferably deviates from the horizontal by an angle within the range of from 35 degrees to 70 degrees. Annular members 33, 34 and 35 are suspended and spaced from the next higher baffle member in the series by support members 36.

Pebbles introduced into the upper end portion of the chamber of Figure 2 flow downwardly and outwardly over the top surface of baffle member 31 without directly contacting upwardly flowing gaseous material. The top surface of the pebble mass within this chamber is defined by the inner surface of top closure member 13. The pebbles gravitate downwardly over the periphery of baffle member 31 and tend to flow inwardly and downwardly, thus seeking the normal angle of repose for the pebbles. This tendency for the pebbles to flow inwardly and downwardly to seek the normal angle of repose is substantially obstructed by the annular baffle members 33, 34 and 35, which greatly deepens the inverted conical cavity formed in the central portion of the pebble mass. Gaseous material which is introduced into the lower portion of this chamber through conduit 19 is distributed within gas distribution chamber 18 as disclosed in connection with the discussion of Figure 1 and the gas is introduced into the lower portion of the gravitating pebble mass in the manner discussed in connection with that chamber.

The gaseous material flowing upwardly through the axial portion of this chamber flows into the lower portion of the cavity formed in the pebble mass by annular baffle member 35 and gaseous materials flowing upwardly through annuli progressively removed from the axis of this chamber tend to flow into the cavity formed by the various baffle members 31, 33 and 34 at points in substantially the upper portion of such annuli. It will thus be apparent that in the chamber shown as Figure 2 as is the case of the separation with the chamber of Figure 1, gaseous material flowing through the axial portion of the pebble mass have a lesser distance to travel in direct heat exchange with the hotter pebbles than do gases passing through annuli progressively removed from the axial portion of that chamber. Thus, the gases flowing through the hottest pebble portions within the chamber, contact those pebbles for the shortest period of time and gases flowing through cooler pebble portions contact those pebbles for increased periods of time so that the amount of heat exchange between pebbles and gaseous material becomes substantially uniform.

Referring particularly to device shown as Figure 3 of the drawings, chamber 37 comprises an upright elongated chamber 38 closed at its upper and lower ends by closure members 39 and 41, respectively. Pebble inlet conduit 42 is centrally provided in closure member 39 and pebble outlet conduit 43 is centrally provided in closure member 41. The upper end portion of shell 38, designated by numeral 44, is of enlarged cross section and is provided with a concave bottom portion 45 which together with closure member 46, which forms the upper end portion of the chamber of smaller cross section, forms an annular pebble conduit 47 from the periphery of the chamber formed within shell section 44 into the upper end portion of the chamber of smaller cross section. Closure member 46 is an inverted frusto-conical member, the bottom surface of which deviates from the horizontal by an angle greater than the normal angle of repose so as to define the top surface of the pebble mass introduced into the lower portion of the chamber formed within shell 38. Either of the gaseous effluent removal systems described in connection with Figures 1 and 2 of the drawings are utilized in connection with the structure shown in Figure 3. Gaseous effluent conduit 48 extends upwardly from either receptacle 22 of Figure 1 or conical baffle 31 of Figure 2 formed in the upper portion of the chamber of smaller cross-section to the exterior of the pebble heater apparatus. Gaseous reactant material which is introduced through inlet means 19 in the lower portion of the chamber, such as described in connection with Figures 1 and 2 of the drawings, passes through the gravitating pebble mass and resulting effluent material is removed from the upper portion of the chamber of smaller cross-section formed within shell 38 through the effluent collector system 21 or 29 and through effluent outlet conduit 48.

Operation of pebble heater apparatus will better be understood upon reference to Figure 4 of the drawings in which pebbles are introduced into the upper portion of heating chamber 51 through inlet conduit 52 centrally positioned in its upper end portion. Gaseous heating material is introduced into the lower portion of chamber 51 through inlet conduit 53 and flows upwardly through the gravitating mass of pebbles within that chamber raising those pebbles to a desired temperature, generally from 100° to 250° F. above the desired reaction temperature within chamber 11. Gaseous effluent material is removed from the upper portion of chamber 51 through gaseous effluent conduit 54 and the hot pebbles are gravitated from chamber 51 through inlet conduit 15 into the upper end portion of chamber 11 in which the hot pebbles form a gravitating mass which fills the interior of chamber 11 except for the void gas collection areas caused by the effluent collector system in the upper portion of that chamber. Reactant material is introduced into the lower portion of chamber 11 through inlet conduit 19 and gaseous effluent is removed from the upper portion of the chamber through effluent outlet conduits 24, and if the device of Figure 1 is utilized with the separate effluent outlet conduits from effluent collector 26, the portion of the effluent material collected therein is removed from effluent outlet conduit 28. The pebbles gravitate from the lower end portions of chamber 11 through outlet conduit 16 and are elevated to the upper end portion of chamber 51 through elevator 55.

In processes for the production of ethylene from light hydrocarbons such as ethane or propane, the pebble temperature is usually in the range of 1200° F. to 1800° F. In the production of acetylene by pyrolysis of hydrocarbons, temperatures in the range of 1800° F. to 3000° F. are desirable.

Various modifications of this invention may be made by those skilled in the art in view of the foregoing disclosure and discussion without departing from the spirit and scope of this invention.

I claim:

1. An improved pebble heat exchange chamber comprising, in combination, an upright closed elongated shell; a pebble conduit centrally positioned in the upper end of said shell, the inner surface of the top of said shell extending downwardly and outwardly away from said pebble inlet conduit at an angle deviating from the horizontal more than the normal angle of repose of pebbles; pebble outlet means in the lower end of said shell; a perforate annular baffle spaced from the bottom of said shell and forming with the walls of said shell an annular gas distribution chamber; a gasous material inlet conduit extending through the walls of said shell into said gas distribution chamber; and gas collector means disposed within the upper portion of the chamber formed within said shell, said gas collector means comprising a central gas collector extending downwardly in the axial portion of the chamber formed by said shell and being open in its lower end, an annular collector disposed intermediate said central gas collector and the walls of said shell and disposed on a level above the open bottom end of said central collector, the bottom side of said annular collector being open, gas conduit means communicating the inner portion of said annular collector with the interior of said central collector, a peripheral baffle extending downwardly and inwardly from the walls of said shell and being connected at its upper edge by a gas-tight seal to the walls of said shell so as to form a circular gas collector chamber which is open in its bottom end, and gaseous effluent conduit means extending from said circular gas collector chamber to the exterior of said shell, and gaseous effluent conduit means extending from said central gas collector to the exterior of said shell.

2. The pebble heat exchange chamber of claim 1, wherein the lower open ends of said gas collectors are disposed on an imaginary line which deviates from the horizontal by an angle within the range of from 35 degrees to 70 degrees.

3. An improved pebble heat exchange chamber comprising, in combination, an upright closed elongated shell, the upper portion of which is of enlarged cross section; a pebble conduit centrally positioned in the upper end of said shell; pebble outlet means in the lower end of said shell; a closed inner shell within the lower portion of the chamber formed within the shell portion of enlarged cross section, said inner shell being smaller in diameter than said shell portion of enlarged cross section and being spaced from the walls of said outer shell so as to provide an annular conduit therebetween, the lower surface of said inner shell extending downwardly and inwardly from its periphery so as to deviate from the horizontal by an angle greater than the normal angle of repose of pebbles; gas collector means disposed within the upper portion of the chamber formed within the shell portion of smaller cross section, said gas collector means comprising a central gas collector extending downwardly in the axial portion of the chamber formed within the shell portion of smaller cross section and being open in its lower end, an annular collector disposed intermediate said central gas collector and the walls of said shell portion of smaller cross section and disposed on a level above the open end of said central collector, the bottom side of said annular collector being open, gas conduit means communicating the inner portion of said annular collector with the interior of said central collector, a peripheral baffle extending downwardly and inwardly from the walls of said shell portion of smaller cross section and being connected at its upper edge by a gas-tight seal to said walls so as to form a circular gas collector chamber which is open at its bottom end, and gaseous effluent conduit means extending from said circular gas collector to the exterior of said shell, and gaseous effluent conduit means extending from said central gas collector to the exterior of said shell; and gaseous material inlet means in the lower end of said shell.

4. The pebble heat exchange chamber of claim 3, wherein the lower open ends of said gas collectors are disposed on an imaginary line which deviates from the horizontal by an angle within the range of from 35 degrees to 70 degrees.

5. An improved pebble heat exchange chamber comprising, in combination, an upright closed elongated shell; pebble inlet means in the upper end of said shell; pebble outlet means in the lower end of said shell; gas collector means disposed within the upper portion of the chamber formed within said shell, said gas collector means comprising a central gas collector extending downwardly in the axial portion of the chamber formed by said shell and being open in its lower end, an annular collector disposed intermediate said central gas collector and the walls of said shell and disposed on a level above the open bottom end of said central collector, the bottom side of said annular collector being open, gas conduit means communicating the inner portion of said annular collector with the interior of said central collector, a peripheral baffle extending downwardly and inwardly from the walls of said shell and being connected at its upper edge to the walls of said shell so as to form a circular gas collector chamber which is open in its bottom end, gaseous effluent conduit means extending from said circular gas collector chamber to the exterior of said shell, and gaseous effluent conduit means extending from said central gas collector to the exterior of said shell; and gaseous material inlet means in the lower end of said shell.

6. An improved pebble heat exchange chamber comprising, in combination, an upright closed elongated shell; pebble inlet means in the upper end of said shell; pebble outlet means in the lower end of said shell; gas collector means disposed within the upper portion of the chamber formed within said shell, said gas collector means comprising a central gas collector extending downwardly in the axial portion of the chamber formed by said shell and being open in its lower end, an annular gas collector disposed intermediate said central gas collector and the walls of said shell and disposed on a level above the open bottom end of said central collector, the bottom side of said annular collector being open, a peripheral baffle extending downwardly and inwardly from the walls of said shell and being connected at its upper edge to the walls of said shell so as to form a circular gas collector chamber which is open in its bottom end, gaseous effluent conduit means extending from said circular gas collector chamber to the exterior of said shell, and gaseous effluent conduit means communicating the interior of said gas collectors with the exterior of said shell; and gaseous material inlet means in the lower end of said shell.

References Cited in the file of this patent

UNITED STATES PATENTS

| | | |
|---|---|---|
| 2,490,828 | Newton | Dec. 13, 1949 |
| 2,530,731 | Robinson et al. | Nov. 21, 1950 |
| 2,536,436 | Goins | Jan. 2, 1951 |
| 2,571,749 | Norton | Oct. 16, 1951 |
| 2,623,842 | Robinson | Dec. 30, 1952 |